United States Patent [19]

Olsson et al.

[11] Patent Number: 5,033,903
[45] Date of Patent: Jul. 23, 1991

[54] ARRANGEMENT FOR FITTING TOGETHER ELEMENTS

[75] Inventors: Sven O. O. Olsson, Flintvägen; Lars J. Rudman, Filipstadsbacken, both of Sweden

[73] Assignee: Ortic AB, Borlange, Sweden

[21] Appl. No.: 469,422

[22] PCT Filed: Oct. 7, 1988

[86] PCT No.: PCT/SE88/00521
§ 371 Date: Apr. 2, 1990
§ 102(e) Date: Apr. 2, 1990

[87] PCT Pub. No.: WO89/03486
PCT Pub. Date: Apr. 20, 1989

[30] Foreign Application Priority Data

Oct. 9, 1987 [SE] Sweden .................... 8703924

[51] Int. Cl.$^5$ .................... B25G 3/28
[52] U.S. Cl. .................... 403/282; 403/345; 29/525
[58] Field of Search .................... 403/282, 345; 29/525

[56] References Cited

U.S. PATENT DOCUMENTS

| 1,776,615 | 9/1930 | Boothman et al. | 29/525 |
| 2,372,485 | 3/1945 | Griffin | 403/345 X |
| 3,349,649 | 10/1967 | Mele | 29/525 U X |
| 4,269,550 | 5/1981 | DiGiulio | 29/525 X |
| 4,595,349 | 6/1986 | Preston et al. | 29/525 X |

FOREIGN PATENT DOCUMENTS

| 0135257 | 3/1985 | Austria . | |
| 2580341 | 10/1986 | France . | |
| 256380 | 8/1926 | United Kingdom | 403/282 |
| 1537800 | 1/1979 | United Kingdom . | |

Primary Examiner—Andrew V. Kundrat
Attorney, Agent, or Firm—Ware, Fressola, van der Sluys & Adolphson

[57] ABSTRACT

The invention relates to an arrangement for accurately fitting together two elements (1,2) one of which is provided with a projection (8) and the other with a recess (4) adapted to receive the projection, one (1) of the elements being machined to exact dimensions, whereas the other (2) element is manufactured by extrusion or like process. The novelty of the invention resides in that the machined element (1) of a hard material is provided with portions (9-11) serving as cutting means, while the other element of a softer material, adjacent its portions (12) for engaging the former element, is provided with excess material (14) which is adapted to be wholly or partly removed while the elements are being assembled.

2 Claims, 2 Drawing Sheets

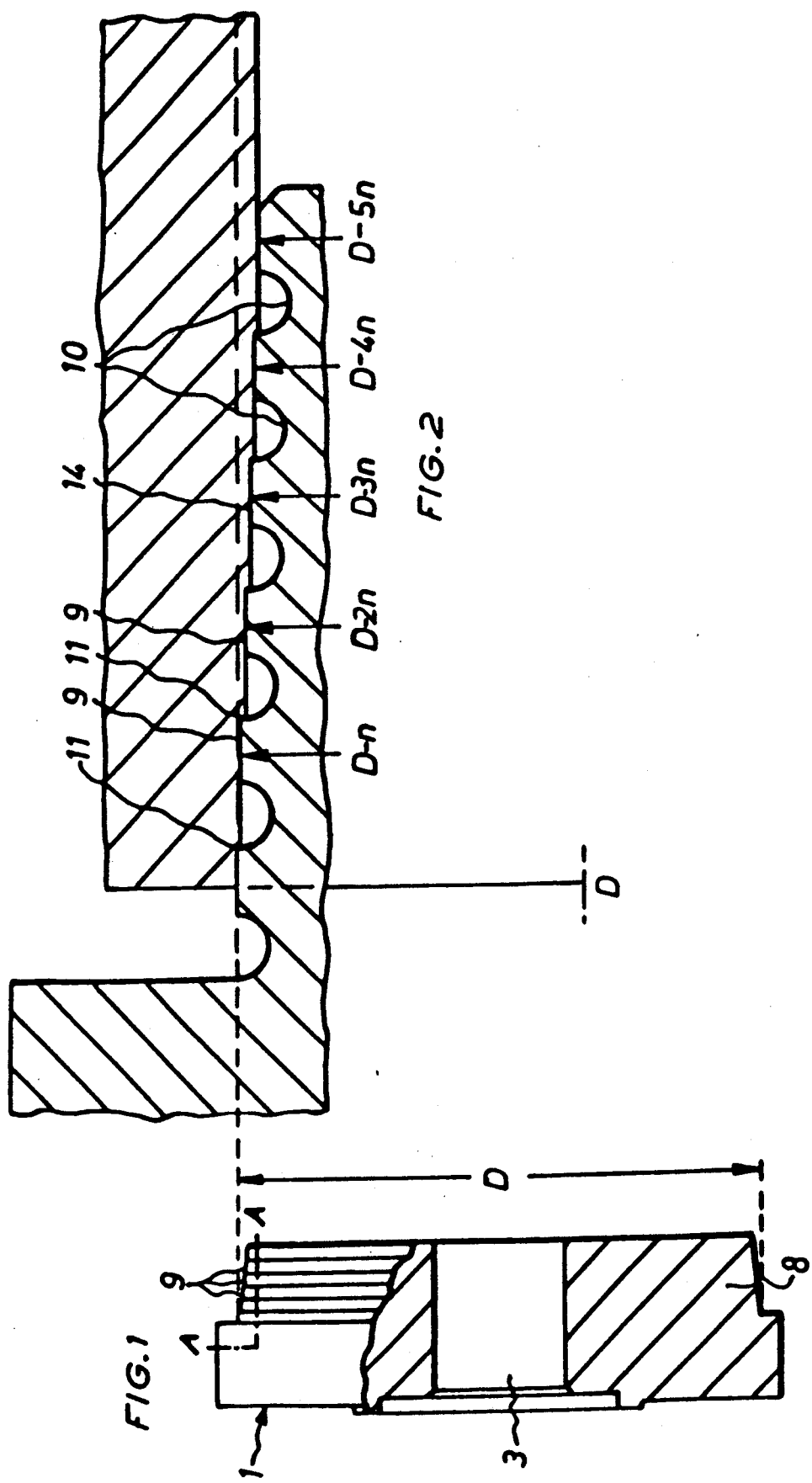

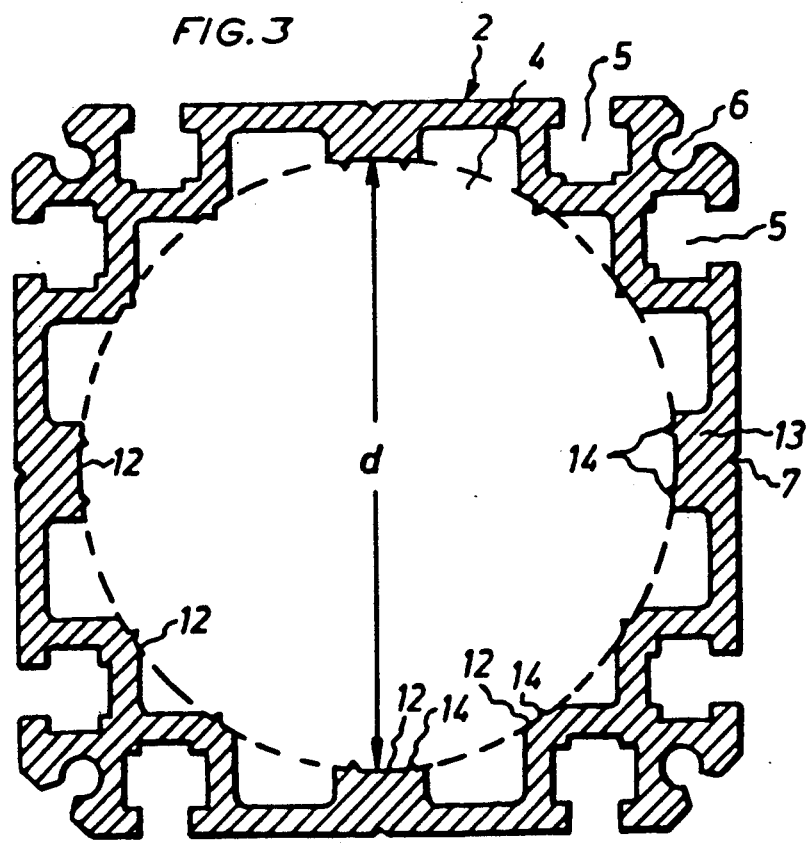

ARRANGEMENT FOR FITTING TOGETHER ELEMENTS

BACKGROUND OF THE INVENTION

The present invention relates generally to an arrangement accurately fitting together two elements and, more particularly, to an arrangement for fitting together two elements where one element is provided with a projection and the other element is provided with a recess adapted to receive the projection.

Owing to tool wear, the forming temperature of the metal, the speed and other circumstances affecting the manufacture, extruded sections and other components manufactured by similar processes, particularly hollow sections, can be allowed to deviate to a relatively large extent from the nominal dimensions, without becoming useless for that reason. Because of the practically inevitable dimensional differences, it has until now been considered necessary to rework such products in the cases where accurate fitting to other components has been required Internal reworking in also external reworking of elongate workpieces demand special tools and make it impossible to utilize, for example, the advantage of supplying stock lengths of a material to a mounting workshop which could simply cut the sections to the desired lengths.

The main object of the invention is to provide an arrangement which renders it possible to use, for machine or frame structures where close tolerances and accuracy are required, sections and the like which cannot be manufactured with accurate dimensions.

SUMMARY OF THE INVENTION

According to the invention, an element which has been machined in advance to fixed dimensions and which is of a harder material than the element which is manufactured by extrusion or a similar process, serves as a working means during assembly of the elements, whereby it is possible to use sections and like components with relatively big dimensional differences and yet obtain the desired accuracy.

It is common practice to form, for example, recesses in extruded sections with ribs, tabs etc. which yield upon assembly thereby to bridge a poor fit. However, this does not give the desired accurate fit since it cannot be definitely established how the ribs etc. will be deformed. For example, the entire deviation may be taken up by the deformation of but one rib, the other ribs remaining unaffected. Indenting or serrating the engaging portions of the element of the harder material is not enough to bring the intended effect since metal chips adhering to an engaging surface may cause wedging and skewing.

By arranging, in accordance with the invention, a series of engaging surfaces extending in parallel with the direction in which the elements are moved for assembly and providing each of the surfaces with a sharp edge and forming, between the engaging surfaces adjacent their sharp edge, a chip-receiving depression, the desired accuracy is obtained. Because of the surfaces extending in parallel with the direction of assembly, and the intermediate depressions, the elements can be rectilinearly brought together, with no risk of tilting due to collected chips, wedging or the like.

BRIEF DESCRIPTION OF THE DRAWINGS

One embodiment of the arrangement according to the invention will be described in greater detail below with reference to the accompanying drawing in which FIG. 1 is a side view, partly in cross-section, of an element chosen as an example, FIG. 2 is an enlarged cross-sectional view of a portion of the element shown in FIG. 1, which has been broken away along line A—A, and FIG. 3 is a cross-sectional view of an extruded element chosen as an example and adapted to be joined with the element shown in FIG. 1.

DETAILED DESCRIPTION OF THE INVENTION

The arrangement comprises two elements which are included in the frame of a machine and which, in the embodiment illustrated, consist of an end piece 1 and a hollow beam 2. The end piece 1 is adapted to support a bearing or the like for a shaft not shown which is to be centered in and extend through the beam, and is formed with a central bore 3. The end piece 1 is made of steel or like material and has been carefully finished.

The hollow beam 2 which is supported at one end by an end piece 1 and through which the shaft is to extend, is made by extrusion of light metal. The beam 2 has a central opening 4 and external T grooves 5 for receiving bolt heads, round grooves 6 adapted to receive self-tapping-screws, and grooves 7 which mark the center of the beam and which facilitate adjustment of the beam and boring of any necessary screw holes and the like.

The end piece 1 has a projection 8 which is adapted to be received in the opening 4 of the hollow beam and which comprises, a number of guide surfaces 9 oriented in parallel with the direction of assembly, i.e. in parallel with the shaft through the bore 3, and arranged in a step-like manner. The guide surfaces 9 are separated by circumferential grooves 10 of circular arc cross-section, and the edge between each groove and the, as seen in the direction of assembly, trailing surface, is a sharp cutting edge 11.

The central opening 4 of the hollow beam comprises a number of inwardly facing abutment surfaces 12 formed by bevelling the inwardly projecting corners, and ribs 13 integral with the beam are arranged along the side walls. The diameter d between the abutment surfaces 12 is adapted to the diameter D of the base portion of the projection 8, i.e. the surface 9 adjacent the end piece proper.

For reasons which are obvious from what has been said above, it is not possible, in production by extrusion, to keep approximately the same small tolerances as in production by machining, and therefore assembly of the elements may cause difficulties, primarily in the form of radial play, or in that the projection does not bottom properly. According to the invention, portions with excess material are formed on the abutment surfaces 12 of the extruded element 2, more precisely one or two ridges or ribs 14 arranged along each abutment surface 12.

In the production of extruded elements, deviations of up to, say, one millimeter from the nominal value, although less in respect of the material thickness, can be accepted, which means that upon assembly of the elements dimensional differences of the same order of magnitude must be bridged; otherwise the accuracy of the fit or centering will be jeopardized.

By providing, as here suggested, the end piece 1 with a number of stepped cutting edges 11 connected with the axially oriented guide surfaces 9, the end piece 1 is able to cut a hold position in the extruded element 2 while the elements are being assembled.

In FIG. 2, the edges 11 and the guide surfaces 9 of the projection have gradually cut into or cut away a ridge 14 arranged along an abutment surface 12, such that, when the projection has reached its bottom position, each guide surface 9 engages a planar portion cut into the ridge 14.

If, for example, the outer diameter of the guide surface 9 adjacent the base of the projection is designated D and equals the diameter d extending between the abutment surfaces 12 of the beam opening, the diameters of the subsequent stepped surfaces 9 can be set at D-0.2, D-0.4, D-0.6, D-0.8 and D-1 millimeter. In this manner, it is possible to bridge a deviation in tolerance of one millimeter, and for every dimension within this value, the elements will be properly fitted and centered.

The circumferential grooves 10 arranged between each of the surfaces 9 serve to collect and remove chips which are cut or shorn from the respective ridge 14, such that chips or metal particles do not enter between the surfaces 9 and the cut surfaces of the ridge 14 and thus cannot cause wedging.

A large number of abutment surfaces 12 and ridges 14 projecting therefrom are concurrently engaged by the cutting edges 11 of the projection 8, and the uniform distribution of the ridges and the abutment surfaces around the opening 4 minimizes the risk of tilting.

If the diameter d in the beam opening 4 were slightly larger than the diameter D of the projection 8, the surface 9 adjacent the base of the projection would not even in the fully assembled state reach all the way to the abutment surface 12, and as a result, the extruded element, if designed in conventional manner, would have to be scrapped.

Since the surfaces 9 of the element 2 according to the invention cut their own seats in the respective ridge 14, and these seats become fully concentrically arranged, the projection 8 which then only engages the cut surfaces of the ridges 14, will in any case be fully centered.

It will be appreciated that the embodiment shown is only example.

In the event it is desired to insert a portion of an extruded or similarly manufactured element into a recess in a machined element, the inventive arrangement can, of course, also be used. In this case, surfaces which are arranged in a step-like manner and extend in parallel with the direction of assembly, are provided with a cutting edge and intermediate recesses or grooves inside the machined element, and the extruded element is provided with external abutment surfaces oriented in the direction of assembly and having longitudinal ridges or ribs projecting therefrom.

Even if, in the embodiment shown, the surfaces 9 provided with the cutting edges 12 and the grooves 11 are circumferential, it is obvious that such surfaces need only be arranged substantially in alignment with those portions of the receiving element which have complementary abutment surfaces and associated ridges.

Having thus described the invention, what is claimed is:

1. An arrangement for accurately fitting together two elements included in a machine structure or the like, the first element is provided with an end piece having a round projection and the second element is provided with a recess in the form of a through opening adapted to receive said projection, said first element is at least partly made of a hard material, being machined to exact dimensions, whereas the second element which is made of a softer material, is manufactured by a forming method which results in possible dimensional differences within predetermined ranges, the first element of the hard material, adjacent its portion engaging the second element, being provided with portions serving as cutting means, while the second element of the softer material, adjacent its portions for engaging the first element, is provided with excess material adapted to be wholly or partly removed by said cutting means while the elements are being assembled characterized in that the first element of the harder material has said end piece machined to the desired dimensions and having a central shaft bore or like design which requires centering, that the second element of the softer material consists of a beam-shaped, hollow structural element through which a shaft or the like is adapted to extend, that said round projection is adapted to be inserted in an opening at the end of said beam-shaped element, said portions serving as cutting means are arranged on an outwardly facing surface of said projection of the first element of the hard material extending in the direction in which said elements are moved for assembly, and comprise at least one series of circumferential surfaces extending substantially in parallel with a center axis of said projection and forming said engaging surfaces, said circumferential surfaces being positioned at a radial distance from the center axis of said projection, which increases step by step as seen from the end of said projection, and, between said circumferential surfaces there is defined circumferential grooves preferably of circular arc cross-section, the outwardly facing edges between each circumferential surface and groove forming cutting edges of the cutting means, and that said portions with excess material formed on the second element of the softer material have, in the dimensional direction, an extent, the size of which is substantially equal to a possible dimensional variation arising during manufacture and have at least three inwardly facing, peripherally spaced engaging surfaces, which are oriented in the longitudinal direction of said opening and have a shape adapted to the round projection, with ridges or ribs arranged along at least some of said at least three engaging surfaces formed on the second element of the softer material and oriented in the direction of assembly.

2. The arrangement as claimed in claim 1, characterized in that said at least three engaging surfaces are a large number of engaging surfaces which are diametrically opposed in pairs, and that along at least two of the pairs of engaging surfaces, there are formed, two of said ridges or ribs.

* * * * *